April 20, 1937.  W. R. POSTLEWAITE  2,077,769
PIPE COUPLING APPARATUS
Filed June 24, 1935
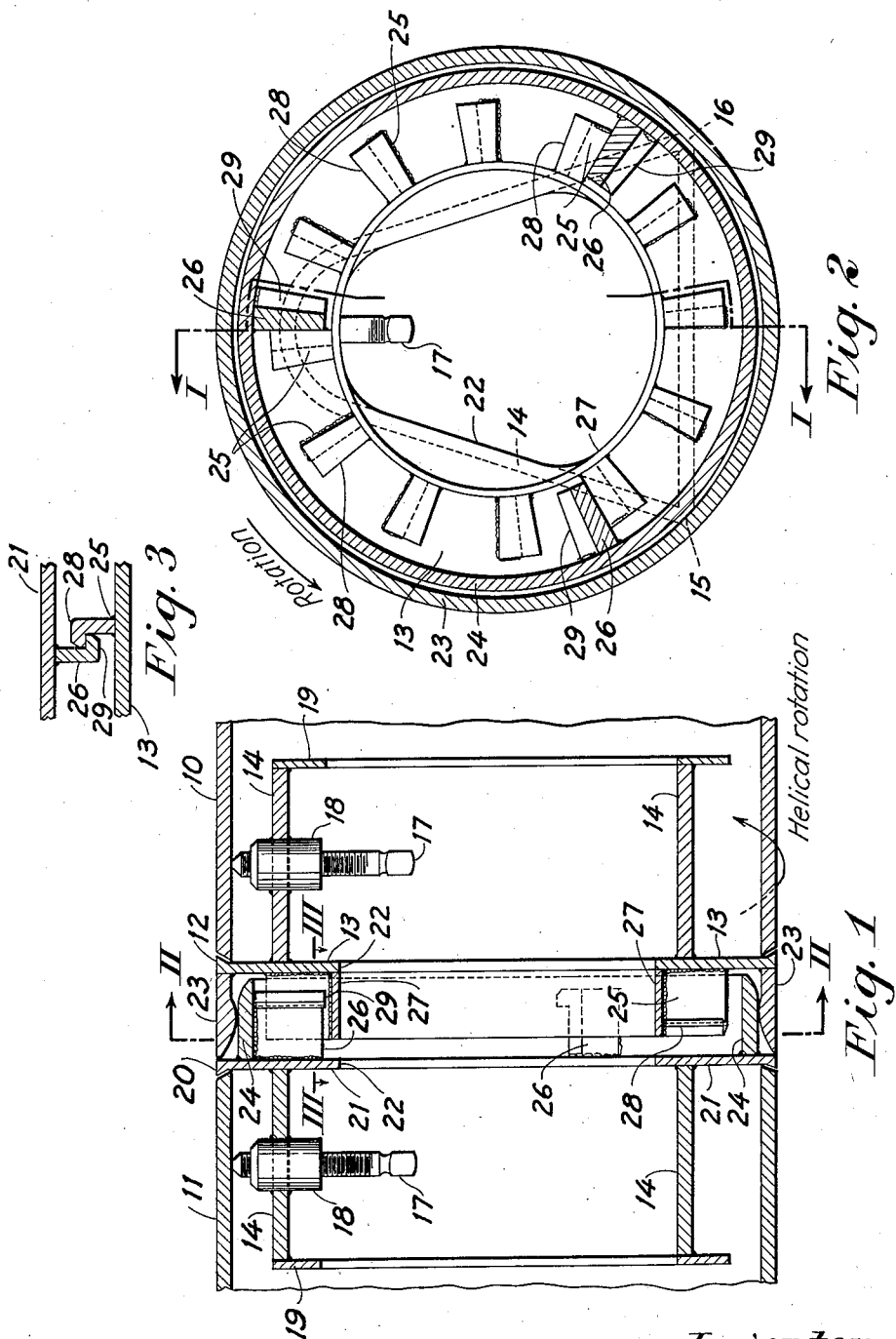
Inventor
William R. Postlewaite
By: /s/ J. Adams
Attorney Patented Apr. 20, 1937

2,077,769

UNITED STATES PATENT OFFICE 2,077,769

PIPE COUPLING APPARATUS

William R. Postlewaite, San Francisco, Calif., assignor to Standard Oil Company of California, San Francisco, Calif., a corporation of Delaware Application June 24, 1935, Serial No. 28,094

9 Claims. (Cl. 285—1)

This invention relates to a pipe coupling apparatus and particularly one for temporarily securing together successive lengths of pipe as they are passed through a machine for applying a coating to their outer surface. These machines operate continuously and usually require the pipe to be given a helical or screwing motion either through a nozzle which extrudes a thick coating onto the pipe or past a chute from which a flexible tape carrying an initially plastic material is wrapped about the pipe. Such devices and their methods of operation are shown in McDonald et al. Patent No. 1,988,628.

Those couplers heretofore used in this art, such as that of the Boylan et al. Patent No. 1,948,956, would fulfil in general the requirements of such a device; namely, to secure together adjacent lengths of pipe as they passed through the coating machine, and then permit the foremost length, after it had received its coating, to be disengaged and removed to storage or use. These prior devices were found to be satisfactory on new and perfectly straight pipe, but when crooked or reclaimed or even slightly bent pipe sections were being coupled together the free end of the pipe length already in the helical feed mechanism would whip and oscillate about in such a manner as to prevent the aligning and engagement of the coupler in the succeeding pipe length. Oftentimes the protruding jaws would either throw the latter off its carriage or would engage improperly and eccentrically so as to become tightly wedged together. Such action was particularly noted when lengths of 40 feet and over were used, and usually required the stopping of the feed and coating mechanism until the coupling elements could be aligned and engaged. This seriously interfered with successful and continuous operation and was particularly objectionable where the engaging elements or jaws of the coupler were relatively few in number, such as two or four and extended for a relatively long distance from the ends of the pipes to be coupled.

It is an object of this invention to provide a pipe coupling apparatus of this nature which may be easily and positively aligned when used with reclaimed or crooked pipe.

Another object is to provide a coupler in which the aligning means will be effective to operate before the torque transmitting means will become engaged to rotate the length of pipe being coupled to one already rotating or advancing helically.

Another object is to provide a coupler in which there are a relatively large number of torque transmitting elements, any group of which may be engaged with its mating group or disengaged therefrom with a minimum of backlash and shock to the pipe being coupled, or damage to a coating material which may be in place thereon.

These and other objects and advantages will be more fully apparent from the following description and the accompanying drawing, which forms a part of this specification and illustrates a preferred embodiment of this invention.

In the drawing: Figure 1 is a substantially longitudinal sectional view of a coupling embodying this invention, taken in a plane indicated by line I—I of Figure 2.

Figure 2 is a transverse sectional view of this coupling on a plane indicated by line II—II of Figure 1.

Figure 3 is a sectional view of a pair of engaged lugs on a plane indicated by line III—III of Figure 1.

Broadly the coupler comprises a pair of cooperating elements or plugs each adapted to be inserted into the adjacent ends of the pipe sections to be joined. Aligning means are provided to guide the one coupler plug into proper relation with its mate so that a complementary torque transmitting means will engage smoothly and properly, and so that the two pipe sections will be truly aligned during engagement. Means may be provided in the coupler to cause the leading or foremost pipe section to advance or carry forward the trailing section, as in the Boylan Patent No. 1,948,956, above cited, or some other means independent of the coupler may be utilized to cause the trailing section to be urged forwardly against the one preceding it through the pipe feeding or coating mechanism.

In the example shown, pipe 10 is the leading, and pipe 11 is the trailing section. Plug 12 is inserted in pipe 10, and generally comprises a plate 13, of substantially the same diameter as pipe 10. Means for securing plate 13 to pipe 10 are provided, in the form of a forwardly extending generally triangular frame 14, whose two apices 15 and 16 bear against the inner surface of the pipe (Figure 2). An adjustable clamp member, such as set screw 17, passes through threaded bushing 18, at the third apex of frame 14, and may be extended outwardly to secure the plug 12 to the pipe 10, or retracted so that the plug may be removed. A stiffening web 19 may be secured as by welding to the outer or unsupported edge of frame 14, as shown.

Plug 20, which is inserted in pipe 11, is similarly fabricated with a plate 21, frame 14, set screw 17 and bushing 18. Plates 13 and 21 are each provided with an opening 22, so that access may be had to set screws 17, for operating the same. From this point on, however, the respective constructions of plugs 12 and 20 differ, as will be outlined below.

Aligning means for the two plugs 12 and 20, in this example, comprise cylindrical rings 23 and 24, as shown in Figure 1. Ring 23 is substantially the diameter of pipe 10 and extends rearwardly from plate 13 of plug 12. Ring 24 is of a suitable outer diameter to be easily received within ring 23, and extends forwardly from plate 21 of plug 20. In operation, it has been found relatively easy to engage or "stab" ring 24 into ring 23, even though pipe section 10 may be bent, and, due to its rotation or helical movement through a pipe coating machine, may be oscillating and whipping about its proper position.

The torque transmitting means, by virtue of which the rotation component of the generally helical motion of the driven pipe may be transmitted to the other section, is somewhat similar to a jaw clutch. A plurality of axial lugs 25 extend rearwardly from plate 13, and are adapted to engage a plurality (usually fewer in number) of similar lugs 26 extending forwardly from plate 21. In this example, for a coupling apparatus for twelve-inch pipe, there are twelve lugs 25 and three lugs 26. Preferably, lugs 25 and 26 are shorter, in an axial direction, than rings 23 and 24, so that alignment of the two sections of the coupler will be insured before the lugs engage. A stiffening ring 27 is preferably welded to the inner edges of lugs 25 to strengthen and support them. Aligning ring 24 serves the same purpose for lugs 26.

If it is desired to have the coupler plugs 12 and 20 also act to hold the pipe sections 10 and 11 together longitudinally, that is, to prevent their longitudinal separation, lugs 25 and 26 may be provided, respectively, with interlocking hooks 28 and 29 at their engaging ends as shown in Figure 3. Those hooks 28, on lugs 25 of plug 12, which plug is in the leading pipe 10, face in the direction of the rotation of that pipe and engage hooks 29 on lugs 26 to carry the trailing plug 20 and pipe section 11 along through the usual pipe feeding and coating mechanism. However, as soon as the point at which the helical force is applied to pipe 10 is passed by the coupler, pipe 11 then receives that force and simply pushes along the preceding pipe 10. Thus the previous torque, which acted to engage hooks 28 and 29, is now reversed, by virtue of the frictional drag of the preceding pipe section 10, disengaging hooks 28 and 29 and permitting a slight relative rotation between plugs 12 and 20 as lugs 25 and 26 pass through the angle determined by their spacing, and assume the back-to-back position shown in Figure 2.

Thereafter, when the completely coated pipe section 10 has emerged from its coating operation, plug 12 may be withdrawn from plug 20 by a simple axial or longitudinal motion, and pipe section 10 taken out of the path of the following section 11, which is meanwhile pulling along a third section of pipe through the equipment by virtue of a second coupler similar to the one just described.

As stated above, this latter construction, using hooks 28 and 29 on lugs 25 and 26, respectively, is optional and is not necessary to the advantageous use of the invention, which is believed to reside in the combination of the aligning and torque transmitting means. Therefore, while a specific construction embodying this invention has been described and illustrated, it is to be understood that the invention is not limited to that specific device, and all such modifications and changes as come within the scope of the appended claims are embraced thereby.

I claim:

1. A coupling for temporarily securing together sections of pipe comprising a pair of plugs adapted to engage the pipes, complementary means on said plugs to align the same, and means fixed with regard to said complementary aligning means for transmitting a torque in either direction from one plug to the other.

2. A coupling for temporarily securing together sections of pipe, comprising a pair of plugs adapted to engage the pipes, a pair of axially extending concentric rings, one on each plug, to align the same, and a plurality of mutually engaging lugs fixed to each of said plugs for transmitting torque from one plug to the other.

3. A coupling according to claim 2, with the addition of means on the lugs of one of said plugs to transmit an axial force to a corresponding means on the lugs of the other of said plugs.

4. A coupling according to claim 2, in which one of said concentric rings extends beyond said lugs so that said rings are effective to align said plugs, and the pipes in which said plugs are engaged, before said lugs are effective to transmit torque from one plug to another, during assembly of said coupling.

5. A coupling for temporarily securing together sections of pipe comprising a pair of plugs adapted to engage the pipes, complementary means on said plugs to align the same, and means fixed with regard to said complementary aligning means for transmitting a torque from one plug to the other, said aligning means extending axially from said plugs through a greater distance than said torque transmitting means so that said aligning means are adapted to be engaged in advance of said torque transmitting means when assembling the parts of said coupling.

6. A coupling for temporarily securing together sections of pipe comprising a pair of plugs adapted to engage the pipes, complementary means on said plugs to align the same, and means fixed with regard to said complementary aligning means for transmitting a torque from one plug to the other, said aligning means comprising a pair of axially extending concentric members.

7. A coupling for temporarily securing together sections of pipe comprising a pair of plugs adapted to engage the pipes, complementary means on said plugs to align the same, and means fixed with regard to said complementary aligning means for transmitting a torque from one plug to the other, said aligning means comprising a pair of axially extending concentric members, the outermost of said members being substantially the same diameter as the pipe to be coupled.

8. A coupling for temporarily securing together sections of pipe comprising a pair of plugs adapted to engage the pipes, complementary means on said plugs to align the same, means fixed with regard to said complementary aligning means for transmitting a torque from one plug to the other, and complementary means on said plugs for preventing longitudinal separation of said plugs while one of said plugs is being positively advanced helically in a given direction and the other of said plugs is trailing with a corresponding movement.

9. A coupling for temporarily securing together sections of pipe comprising a pair of plugs adapted to engage the pipes, complementary means on said plugs to align the same, and means fixed with regard to said complementary aligning means for transmitting a torque from one plug to the other, said last named means comprising a plurality of axially extending members on one of said plugs and a fewer number of axially extending members on the other of said plugs.

WILLIAM R. POSTLEWAITE.